United States Patent
Kalla et al.

(10) Patent No.: US 12,197,923 B2
(45) Date of Patent: Jan. 14, 2025

(54) SUPPORTING DIFFERENT SECURITY SCHEMES AFTER POWER CYCLE WITH DIFFERENT BOOT PERSONALITIES FOR NETWORK DEVICES

(71) Applicant: Arista Networks, Inc., Santa Clara, CA (US)

(72) Inventors: Fakherdin Kalla, Burnaby (CA); Edward K Chien, Los Altos, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 39 days.

(21) Appl. No.: 17/843,024

(22) Filed: Jun. 17, 2022

(65) Prior Publication Data

US 2023/0409342 A1    Dec. 21, 2023

(51) Int. Cl.
*G06F 9/4401* (2018.01)

(52) U.S. Cl.
CPC .......... *G06F 9/4408* (2013.01); *G06F 9/4403* (2013.01)

(58) Field of Classification Search
CPC ..... G06F 9/4408; G06F 9/4403; G06F 9/4401
See application file for complete search history.

(56) References Cited

U.S. PATENT DOCUMENTS

| | | | |
|---|---|---|---|
| 6,684,324 B2 | 1/2004 | Floman | |
| 7,233,977 B2 | 6/2007 | Gupta | |
| 7,401,165 B2 | 7/2008 | Nishimoto | |
| 8,539,471 B2 | 9/2013 | Morton | |
| 8,611,957 B2 * | 12/2013 | Ahmed | H04M 1/724 455/558 |
| 9,164,773 B2 * | 10/2015 | Chaganti | G06F 16/182 |
| 9,558,354 B2 * | 1/2017 | Martinez | G06F 9/4401 |
| 11,113,072 B2 | 9/2021 | Kalla et al. | |
| 11,126,518 B1 * | 9/2021 | Chien | G06F 9/4416 |
| 2009/0094450 A1 | 4/2009 | Krzyzanowski | |
| 2010/0235833 A1 | 9/2010 | Huang et al. | |
| 2011/0035575 A1 | 2/2011 | Kwon | |
| 2012/0233450 A1 * | 9/2012 | Lee | G06F 9/4401 713/2 |
| 2015/0253832 A1 | 9/2015 | Nishimoto | |
| 2017/0286128 A1 | 10/2017 | Yang | |
| 2021/0004242 A1 | 1/2021 | Su | |
| 2021/0286629 A1 * | 9/2021 | Mugunda | G06F 9/44505 |
| 2021/0286692 A1 | 9/2021 | Chien | |
| 2023/0251866 A1 * | 8/2023 | Lin | G06F 9/44521 713/2 |

OTHER PUBLICATIONS

International Search Report and Written Opinion, European Patent Office, PCT Application No. PCT/US2023/067590, mailed Sep. 14, 2023.

* cited by examiner

*Primary Examiner* — Tammara R Peyton
(74) *Attorney, Agent, or Firm* — Fountainhead Law Group, PC

(57) ABSTRACT

Devices and methods for managing boot personalities in a network device are disclosed. The method includes, after powering on the network device, a programmable component of the network device outputting a first signal unique to a first boot personality. One or more switches are toggled based on the first signal. The toggling results in connecting at least one of one or more first components in the network device associated with the first boot personality and disconnecting at least one of one or more second components in the network device associated with a second boot personality.

17 Claims, 6 Drawing Sheets

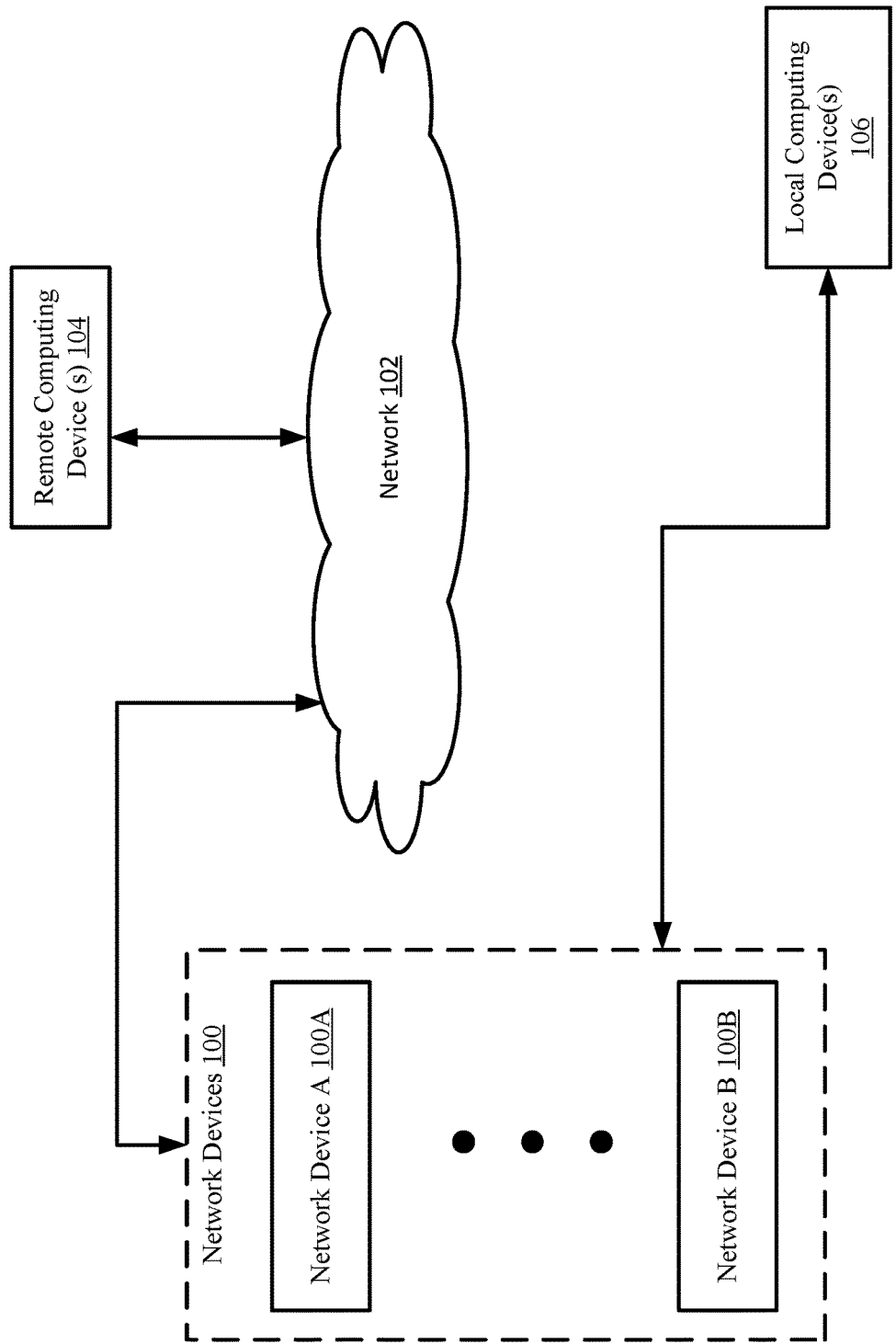
FIG. 1.1

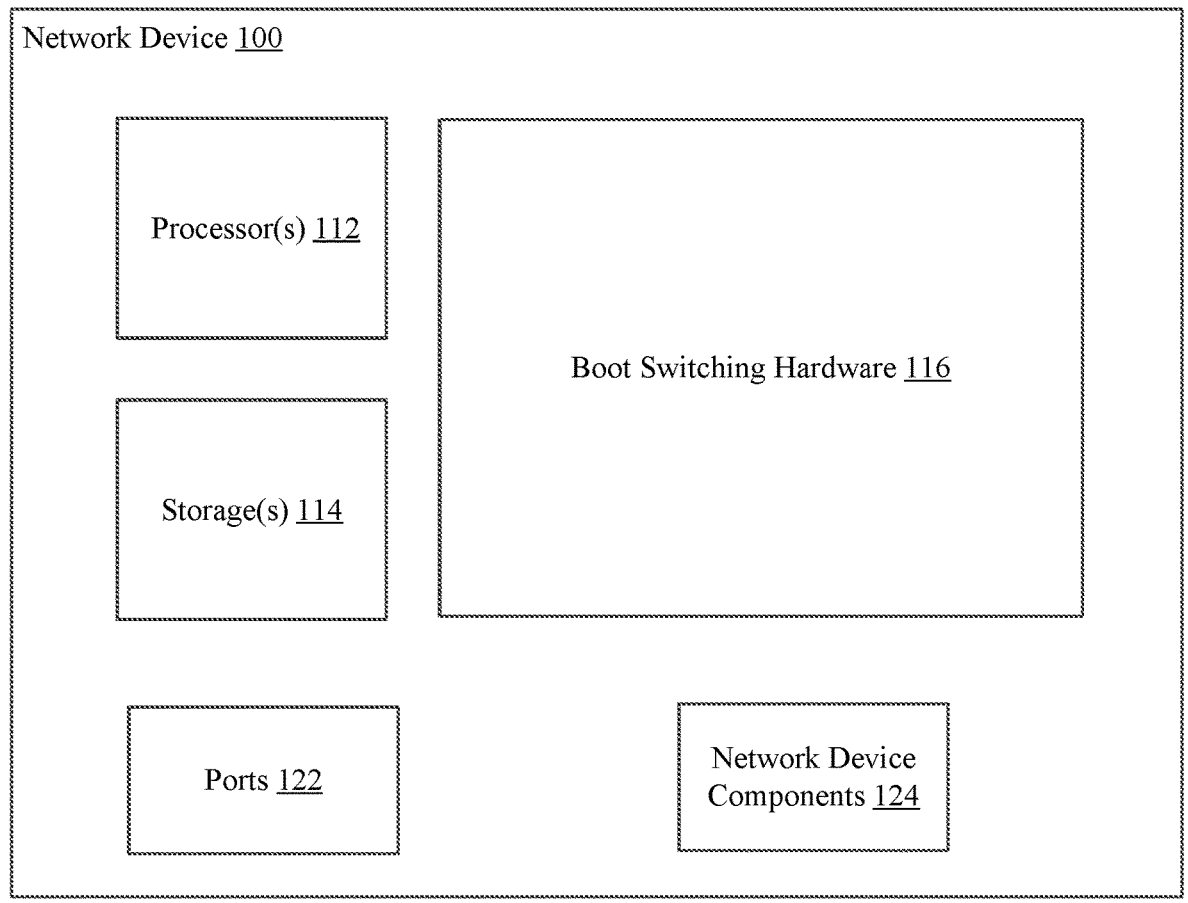
FIG. 1.2

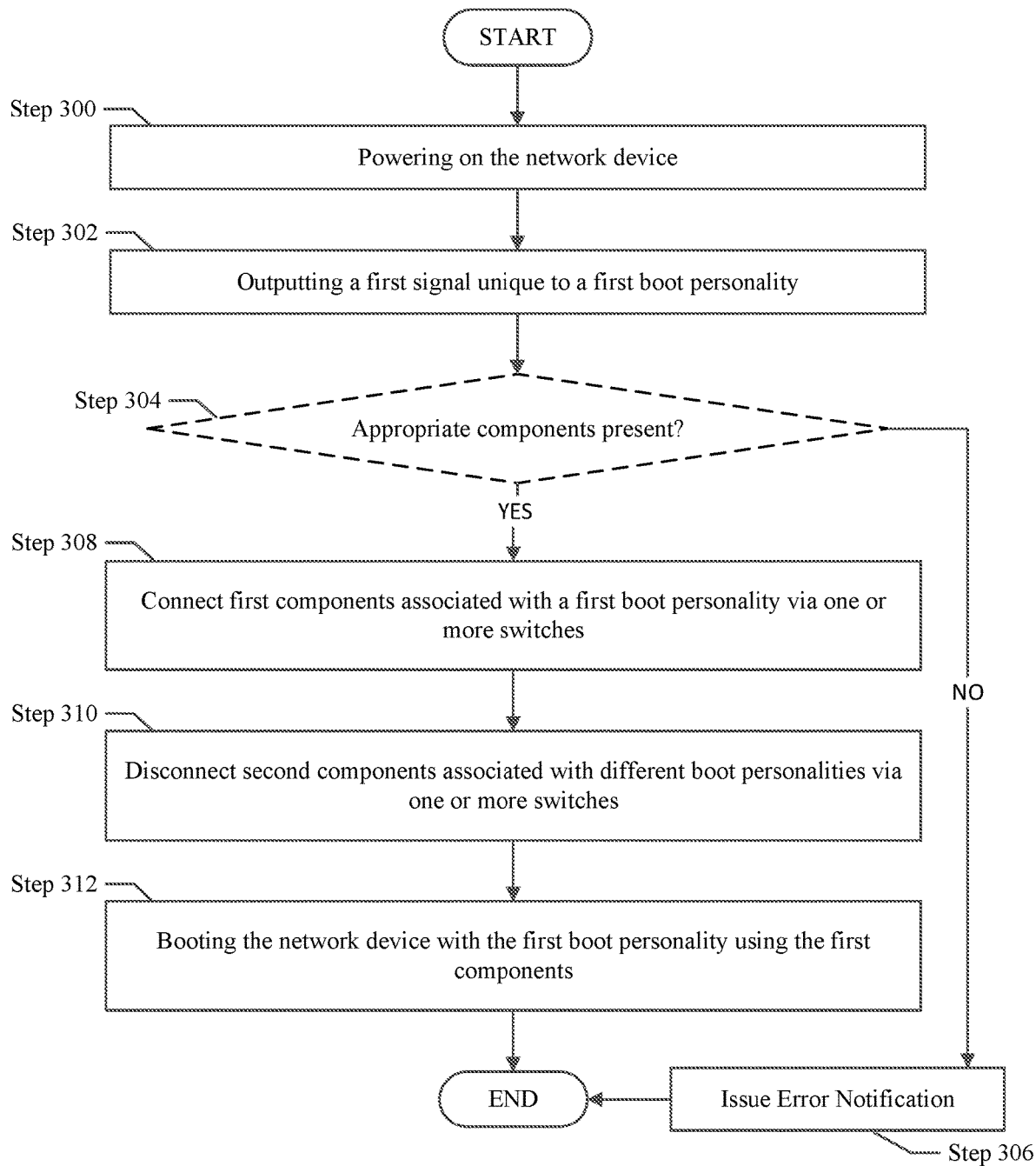
FIG. 3.1

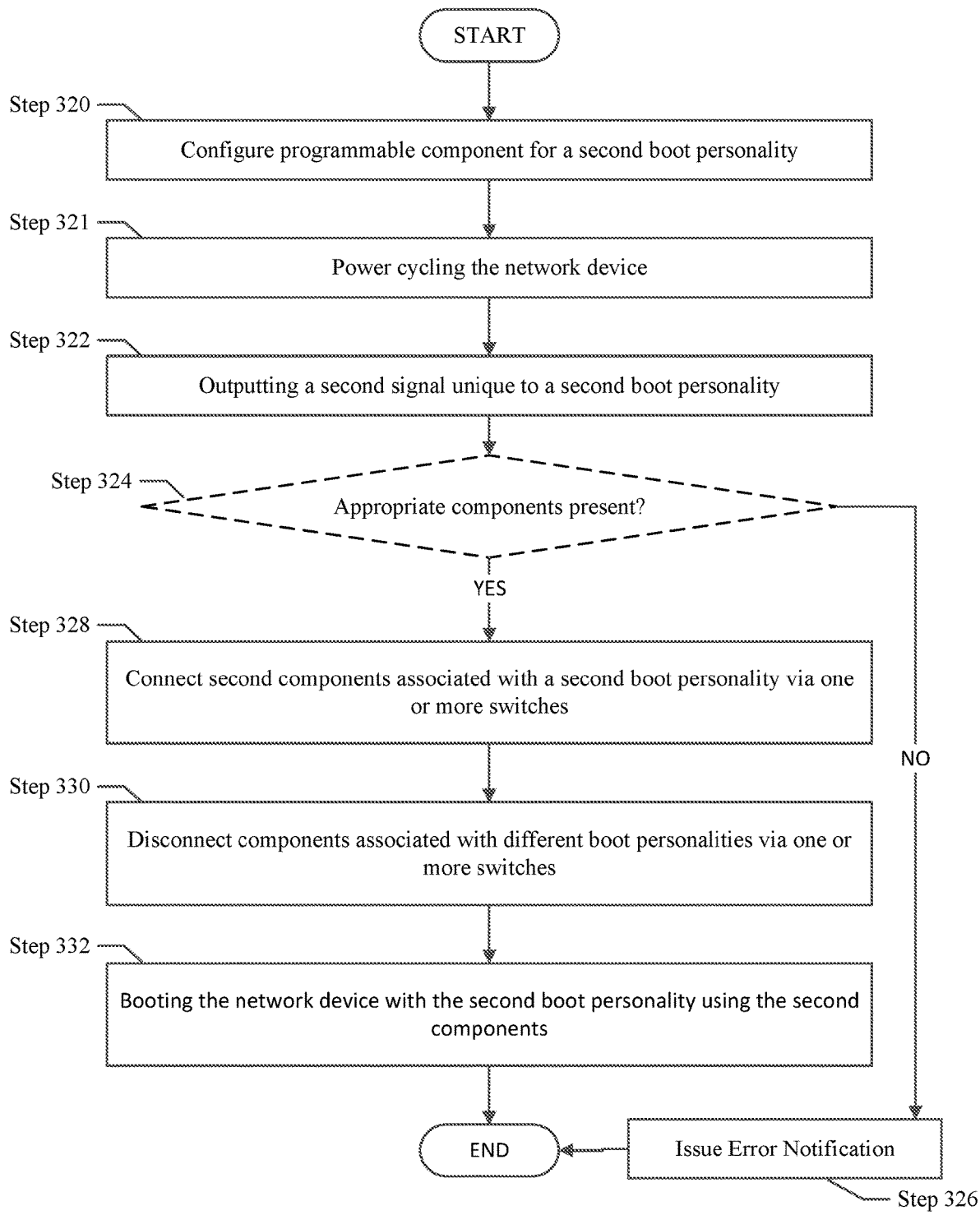
FIG. 3.2

SUPPORTING DIFFERENT SECURITY SCHEMES AFTER POWER CYCLE WITH DIFFERENT BOOT PERSONALITIES FOR NETWORK DEVICES

BACKGROUND

Network devices may have the capabilities to support one or more operating systems executing thereon. Different operating systems may require different sets of hardware in order to execute, resulting in the network device including hardware components associated with multiple operating systems.

BRIEF DESCRIPTION OF DRAWINGS

Certain embodiments of the disclosure will be described with reference to the accompanying drawings. However, the accompanying drawings illustrate only certain aspects or implementations of the disclosure by way of example and are not meant to limit the scope of the claims.

FIG. 1.1 shows a diagram of a system in accordance with one or more embodiments disclosed herein.

FIG. 1.2 shows a diagram of a network device in accordance with one or more embodiments disclosed herein.

FIG. 3.1 shows a flow chart for managing an initial boot personality in accordance with one or more embodiments disclosed herein.

FIG. 3.2 shows a flow chart for managing a boot personality in accordance with one or more embodiments disclosed herein.

DETAILED DESCRIPTION

Figure 2:
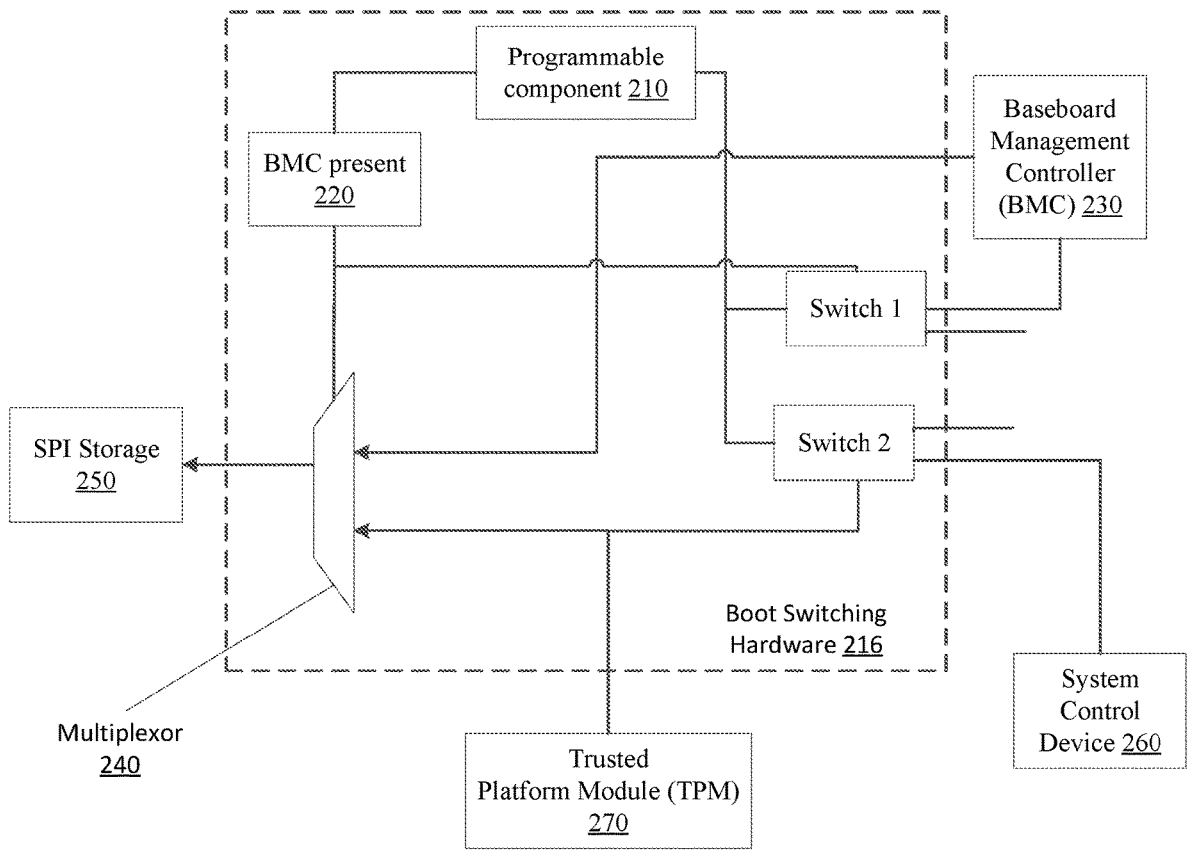
FIG. 2 shows a diagram of a portion of a network device in accordance with one or more embodiments herein.

While booting, a network device may power one or more primary processors prior to powering one or more secondary processors. For example, the network device may power processors for monitoring various aspects of the network device, such as temperature, humidity, power supply voltage, fan speeds, various communication parameters, boot loader configuration, console access (e.g., via a serial port), etc. In this example, the primary processors, and, by extension, an operating system executing thereon, controls monitoring aspects of the network device. One or more secondary processors may, or may not, be powered subsequently to the primary processors.

The scenario of powering only primary processors of a network device before any secondary processor describes a boot personality for the network device. Continuing the example above, when operating using such a boot personality, secondary processors may not be used, and, thus, may be kept in a certain state (e.g., a 'reset' state) because they are not utilized during operation of the network device in the boot personality.

As another example, an operating system for a network device may require that a secondary processor of the network device be powered during boot of the network device prior to powering the traditional primary processors. For example, an operating system may require a baseboard management controller (BMC) to be powered during boot before powering a primary processor of the network device. In such an operating system, the BMC, rather than the traditional primary processor, controls monitoring of various aspects of the network device. For example, the BMC may manage the temperature, humidity, power supply voltage, fan speeds, various communication parameters, boot loader configuration, console access (e.g., via a serial port), etc. of the network device. The scenario of powering a secondary processor of a network device before a primary processor(s) describes another boot personality for the network device.

In addition to processors, a network device may include other hardware components associated with different boot personalities and operating systems. For example, a network device may include hardware associated with certain boot personalities, such as a Trusted Platform Module (TPM).

Further, different operating systems (associated with different boot personalities) of a network device may have different requirements regarding the powering of hardware components (e.g., processors) during the boot of the network device. The hardware components in the network device may have access requirements and security protections associated with the hardware component and/or a given boot personality. For example, an operating system may enable a hardware scheme that defaults to write protections for critical memory devices.

When establishing and/or switching boot personalities, a problem may arise from conflicting requirements and protections of the hardware components associated with different boot personalities.

In general, embodiments are directed to a network device capable of supporting (and/or implementing) multiple boot personalities. Embodiments define hardware security behavior in a network device when switching and/or establishing the boot personality. Such hardware security behavior establishes a security scheme consistent with an operating system associated with a given boot personality. For example, the security scheme may establish the write protections of memory devices and/or enable features through hardware strapping.

One or more embodiments disclosed herein have the advantage of securing a hardware configuration in association with different boot personalities in a single device.

In the text that follows, a description of components of a system in accordance with embodiments disclosed herein is provided with respect to FIGS. 1.1-2. A description of methods that may be performed by components of FIGS. 1.2-2 is provided with respect to FIGS. 3.1-3.2. Lastly, a description of a computing device that may be used to in accordance with the system of FIG. 1 is provided with respect to FIG. 4.

FIG. 1.1 shows an example of a system in accordance with one or more embodiments disclosed herein. In embodiments disclosed herein, the system includes network devices (100). The network devices (100) may be accessed and/or managed by one or more remote computing devices (104). The network devices (100) may also be accessed and/or managed via one or more local computing devices (106). Each of these components is described below.

The remote computing devices(s) (104) may communicate with the network devices (100) over a network (102). The network (102) includes functionality to facilitate communications between these aforementioned components using any known or later discovered networking protocol. The network (102) may include any combination of local area network (LAN) and/or wide area network (WAN) segments, such as the Internet, which may employ any combination of wired and/or wireless connections and communication protocols.

In one or more embodiments of the disclosure, each network device (100) is a physical device that includes persistent storage, memory (e.g., random access memory), one or more processor(s) (including a switch chip), and two or more physical ports. In one or more embodiments of the disclosure, the switch chip is a physical device that determines which egress port on a network device to forward media access control (MAC) frames. The switch chip may include egress and ingress ports that may connect to ports on the network device. Each port may or may not be connected to another device (e.g., a server, a switch, a router, etc.). The network device may be configured to receive packets via the ports and determine whether to: (i) drop the packet; (ii) process the packet in accordance with one or more embodiments of the disclosure; and/or (iii) send the packet, based on the processing, out another port on the network device. Examples of network devices include routers, switches, and multi-layer switches.

The network device(s) (100) includes functionality to allow remote computing devices (104) to communicate with the local computing devices (106). Additional detail about network devices is provided below in FIG. 1.2

In one or more embodiments of the disclosure, each local computing device(s) (106) and/or remote computing device(s) (104) may be implemented as a computing device. In one or more embodiments of the disclosure, a computing device is any device or any set of devices capable of electronically processing instructions and may include, but is not limited to, any of the following: one or more processors, memory (e.g., random access memory (RAM)), input and output device(s), persistent storage, one or more physical interfaces (e.g., network ports), any number of other hardware components (not shown) (e.g., light emitting diodes (LEDs), optical transceivers, network chips, etc.) or any combination thereof. Examples of computing devices include, but are not limited to, a server (e.g., a blade-server in a blade-server chassis, a rack server in a rack, etc.), a desktop computer, a mobile device (e.g., laptop computer,) and/or any other type of computing device with the aforementioned requirements. Additional detail about computing devices is provided in FIG. 4 below.

Those skilled in the art will appreciate that the disclosure is not limited to the system shown in FIG. 1.1.

FIG. 1.2 shows a diagram a network device in accordance with one or more embodiments herein. The network device (100) is a physical device that includes one or more processors (112), boot switching hardware (116), storage (114), two or more physical network interfaces or ports (122) and other network device components (124). Each of these components is described below. Those skilled in the art will appreciate that the network device may include other components that are not shown in FIG. 1.2 without departing from the disclosure.

The network device (100) includes one or more processors (112) as would be understood to one of ordinary skill in the art. Examples of such processors include, but are not limited to, a System Control Device (SCD), a Baseboard Management Controller (BMC), any one or more integrated circuits (ICs), a field programmable gate array (FPGA), an application specific integrated circuit (ASIC), a microcontroller, any device capable of being programmed with device logic and/or capable of executing instructions for performing various operations, and/or any combinations thereof.

The boot switching hardware (116) of the network device includes hardware (e.g., circuitry) associated with establishing and managing the boot personality of the network device. The boot switching hardware (116) may include components specific to a boot personality, or components shared among multiple boot personalities. The boot switching hardware (116) may include one or more programmable components to manage the different boot personalities. Additional detail about the boot switching hardware (116) is provided in FIG. 2.

Continuing with the discussion of FIG. 2, the network device (100) includes storage (114). The storage (114) on a network device (100) may include any type of non-transitory computer readable medium. The storage may include non-persistent storage (e.g., volatile memory, such as random access memory (RAM), cache memory) and/or persistent storage (e.g., a hard disk, an optical drive such as a compact disk (CD) drive or digital versatile disk (DVD) drive, a flash memory, etc.).

The network device (100) may also include two or more physical network interfaces (also referred to as or ports) (122) for connecting to the network device (100). The ports (122) provide connections to other devices, such as other network devices (e.g., 100), local computing device(s) (e.g., 106), etc.

In accordance with embodiments disclosed herein, the network device may include other network device components (124). For example, the network device may include sensors, controllers, and/or other supplementary devices depending on the role of the network device.

In embodiments disclosed herein, the one or more processors (112) of the network device (100) work in conjunction with the boot switching hardware (116) to manage the boot personalities. Further details regarding the boot switching hardware (116) and processors (112) are described in the example of FIG. 2.

Those skilled in the art will appreciate that the disclosure is not limited to the system shown in FIG. 1.2.

FIG. 2 shows a diagram of hardware for a portion of a network device in accordance with one or more embodiments herein. The portion of the network device (200) includes boot switching hardware (216) that includes a programmable component (210), a BMC present module (220), switches (e.g., Switch 1, Switch 2), a multiplexor (240), and a Serial Peripheral Interface (SPI) storage (250). The network device also includes a BMC (230) and SCD (i.e., processors) in accordance with embodiments disclosed herein. The network device (200) also includes a Trusted Platform Module (TPM) (270). Each of these components is described below.

The programmable component (210) is programmable hardware that outputs a signal unique to a desired boot personality. In one or more embodiments, the programmable component (210) outputs the desired boot personality signal upon powering of the network device. In some embodiments, the output signal from the programmable component (210) may only change after powering down the programmable component (210). In other words, in some embodiments, the network device (200) must be power cycled in order to change the output signal of the programmable component (210) and, thus, change the boot personality. In the example of FIG. 2, the programmable component (210) outputs a signal unique to a desired boot personality.

Continuing with the discussion of FIG. 2, the BMC present module (220) is a component that determines the presence of the BMC (230) in the network device. The BMC present module (220) may establish a hardware signal that indicates the presence of the BMC (230). The BMC present module (220) is used, at least in part, as a check to determine whether the network device may use the boot personality stored within the BMC (230). If the BMC is not present, then the BMC present module (220) prevents the network device from attempting to access a boot personality stored in a BMC as, in this scenario, a BMC is not present (or is present but not operational).

Continuing with the discussion of FIG. 2, the BMC (230) is a controller that may be associated with a specific operating system of the network device that utilizes a BMC-based boot personality. For example, the BMC (230) may be a specialized processor that includes multiple interfaces that allows it to monitor the hardware and firmware in the network device (200). For example, the BMC (230) may include functionality to monitor the Basic Input/Output System (BIOS) BIOS firmware, the Unified Extensible Firmware Interface (UEFI) firmware, as well as determine when the various computing components on the motherboard (not shown) in the network device are powered up.

The BMC (230) may include a boot personality, hereafter referred to as a "BMC-based personality". This boot personality includes a set of security and/or operational restrictions on the network device. In one implementation, the BMC-based personality prevents the SCD (260), the TPM (270) and/or the operating system executing on the network device from modifying the contents in, e.g., the SPI storage (250) (i.e., the SPI storage is write-protected with respect to hardware and software components other than the BMC).

The SCD (260) may include a boot personality, hereafter referred to as a "SCD-based personality". This boot personality includes a set of security and/or operational restrictions on the network device (which may be different than the set of security and/or operational restrictions on the network device that are associated with the BMC-based personality). In one implementation, the SCD-based personality enables the SCD (260) and the TPM (270) to modify the contents in, e.g., the SPI storage (250) (i.e., the SPI storage is not write-protected with respect SCD (260) and the TPM (270)).

Continuing with the discussion of FIG. 2, the switches (Switch 1, Switch 2) are hardware-based signal switching components that may be controlled based on the signal output by the programmable component (210). For example, for a BMC-based personality, the switches (Switch 1, Switch 2) may be toggled to connect the BMC (230) and disconnect the SCD (260) and TPM (270). For a SCD-based personality, the switches (Switch 1, Switch 2) may be toggled to connect the SCD (260) and TPM (270) and disconnect the BMC (230). In FIG. 2, the switches (Switch 1, Switch 2) are shown with additional (unconnected) lines. These lines may establish system control signal lines that are multiplexed according to the desired boot personality.

In this example, the TPM (270) is associated with a boot personality established by the SCD (260). The TPM (270) may be considered a hardware security device that conforms the network device (200) to one or more Trusted Computing Group Trusted Platform Module specifications. The TPM (270) may be programmed to include appropriate certificates and keys (which may be included within the certificates) for use by the network device (200) during operation. Such programming may occur during, the manufacturing, process of the network device (200).

The TPM (270) and the SCD (260) may work in conjunction in an SCD-based boot personality in accordance with embodiments disclosed herein. The SCD (260) is a hardware component, for example a FPGA, that includes an operating system associated with a boot personality.

The multiplexor (240) multiplexes received signals for the SPI storage (250). The SPI storage (250) may include flash memory to be used by an operating system to boot and/or operate the network device (200). As discussed above, write protections of the SPI storage may be established in accordance with one or more boot personalities. Given such write protections, a conflict may arise when switching between different boot personalities. Embodiments disclosed herein have the advantage of alleviating any such conflicts by establishing a security scheme for switching between boot personalities using the signal output by the programmable component (210) and the switches (Switch 1, Switch 2).

While FIG. 2 shows two switches and a programmable component configured to enable the network device to toggle between a BMC-based personality and a SCD-based personality, embodiments may be extended to include any number of different boot personalities. In such scenarios, the network device may include additional switches and/or multiplexors (240) along with a programmable component that is capable of outputting different signals to enable the network device to toggle between the different boot personalities.

FIGS. 3.1-3.2 describe methods for managing boot personalities in accordance with one or more embodiments disclosed herein. FIG. 3.1 shows a flow chart for managing an initial boot personality in accordance with one or more embodiments disclosed herein.

Initially, the network device is powered on in Step 300. After powering, a first signal unique to a first boot personality is outputted in Step 302. The signal is outputted by a programmable component in the boot switching hardware upon powering the device in accordance with one or more embodiments disclosed herein.

In some embodiments, in Step 304, it is determined if the appropriate components are present for the boot personality indicated by the first signal. In other words, the BMC present module (i.e., 220) receives the signal indicating the boot personality and verifies that the hardware components necessary for the boot personality are present in the boot switching hardware. Step 304 is optional in accordance with embodiments disclosed herein because such verification may not be necessary for all boot personalities and hardware configurations.

It is noted that embodiments employing Step 304 provide a hardware mechanism to prevent an attempt to switch to a boot personality without the necessary hardware. In some embodiments, software mechanisms may be used to determine if the BMC present module for verifying the necessary hardware components is present in the system. As such, embodiments disclosed herein have the versatility of using a same hardware design adjustable for different configurations based on the needs of a user of the network device.

If it is determined that the appropriate components are not present in the hardware ("NO" in Step 304), an error notification is issued in Step 306. In some embodiments, the error notification may result in a powering down of the network device. In some of these embodiments, the network device may power cycle and default to a specific boot personality. In some embodiments, the error notification may result in the network device entering a standby state to await further programming.

If it is determined that the appropriate components are present ("YES" in Step 304), first components associated with the first boot personality are connected using one or more switches in Step 308. In embodiments disclosed herein, the switches may be controlled based on the signal unique to the boot personality. The controlling of the switches may include sending a signal to the switch that results in the switch either transmitting an input signal or blocking an input signal.

In Step 310, other components associated with different boot personalities are disconnected using one or more switches. In embodiments disclosed herein, Step 308 and Step 310 may occur concurrently. The boot switching hardware may include any number of switches that are controlled based on the signal to connect and disconnect the appropriate components to achieve the desired boot personality in accordance with embodiments disclosed herein.

In Step 312, the network device boots with the first boot personality using the first components in accordance with embodiments disclosed herein. Step 312 results in the network device booting up in the desired personality.

FIG. 3.2 shows a flow chart for managing a boot personality in accordance with one or more embodiments disclosed herein. Prior to FIG. 3.2, the network device has successfully booted into a first boot personality (e.g., in accordance with FIG. 3.1). In Step 320, a programmable component of the boot switching hardware is configured for a second boot personality. The configuration is achieved by sending signals to the programmable component.

In some embodiments, the configuration of the programmable component may be restricted to direct access to the network device. For example, the configuration of the programmable component may only be achieved through a device directly connected to a physical network interface of the network device via a direct physical connection (e.g., using cable). In this scenario, a configuration signal may be transmitted from the directly connected device to the programmable component in order to set or change the boot personality of the network device. The result of receiving the configuration signal is a configuration change in the programmable component such that when it is power cycled (or powered on), it outputs a unique signal corresponding to the boot personality for which it was configured.

As described, the programmable component of the boot switching hardware outputs a signal unique to a desired boot personality. In some embodiments, in order for the programmable component to change the output signal, and hence the boot personality, power to the programmable component must be terminated.

In Step 321, the network device is power cycled. Upon powering up in the power cycle, the programmable component outputs a second signal unique to a second boot personality, different from the first boot personality in Step 322.

Optionally, in Step 324, it is determined if the appropriate components are present for the second boot personality indicated by the second signal. Similar to FIG. 3.1, a BMC present module may receive the second signal indicating the second boot personality and verify that the hardware components necessary for the second boot personality are present in the boot switching hardware.

If it is determined that the appropriate components for the second boot personality are not present in the hardware ("NO" in Step 324), an error notification is issued in Step 326. In some embodiments, the error notification may result in a powering down of the network device. In some of these embodiments, the network device may power cycle and default back to the first boot personality. In other embodiments, the error notification may result in the network device entering a standby state to await further programming.

If it is determined that the appropriate components for the second boot personality are present ("YES" in Step 324), second components associated with the second boot personality are connected using one or more switches in Step 328. In embodiments disclosed herein, the switches may be controlled based on the signal unique to the boot personality.

In Step 330, other components associated with different boot personalities are disconnected using one or more switches. For example, components associated solely with the first boot personality may be disconnected. In embodiments disclosed herein, Step 328 and Step 330 may occur concurrently. The boot switching hardware may include any number of switches that are controlled based on the signal to connect and disconnect the appropriate components to achieve the desired boot personality in accordance with embodiments disclosed herein.

In Step 332, the network device boots with the second boot personality using the second components in accordance with embodiments disclosed herein. Step 332 results in the network device booting up in the desired personality.

Figure 4:
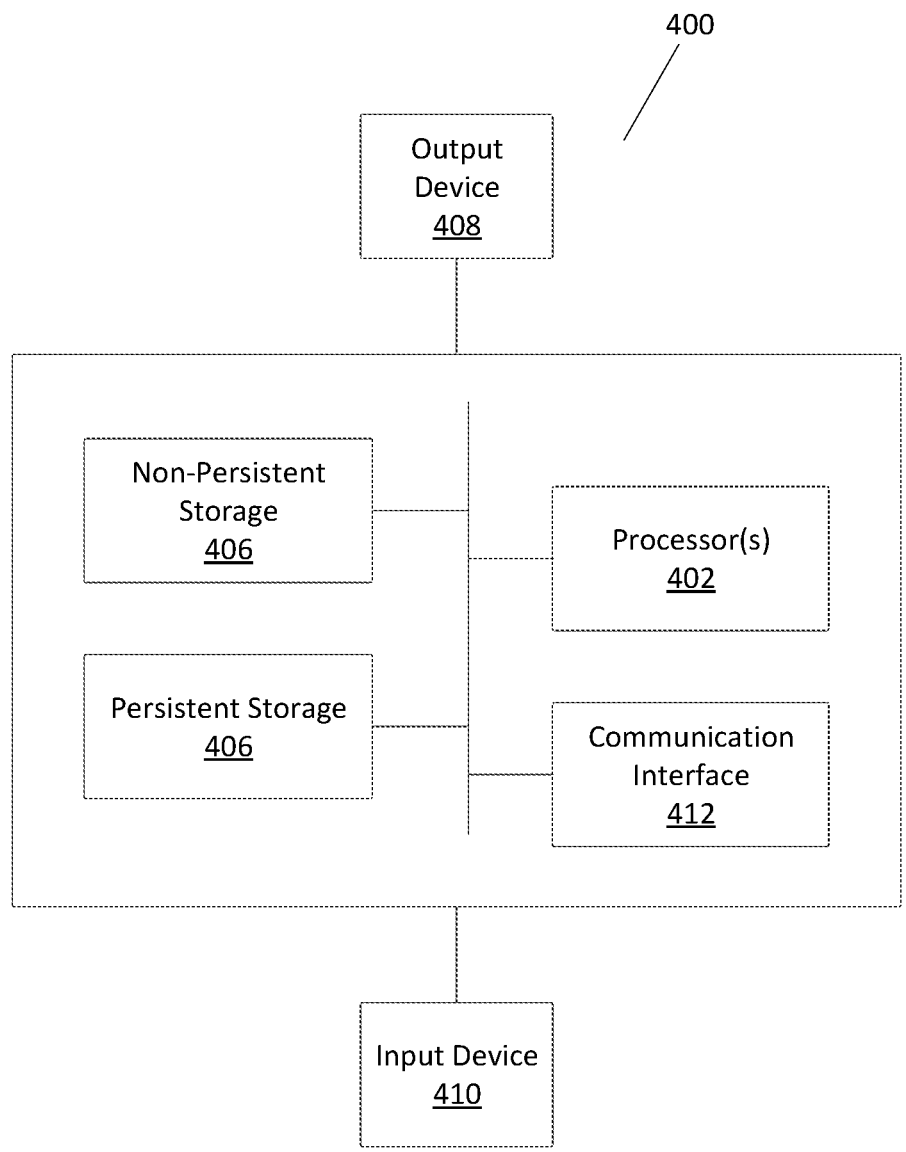
FIG. 4 shows a computing device in accordance with one or more embodiments disclosed herein.

As discussed above, embodiments of the disclosure may be implemented using computing devices. FIG. 4 shows a diagram of a computing device (400) in accordance with one or more embodiments of the disclosure. For example, a computing system (400) may be used as a local computing device (106), or remote computing device (104) shown in FIG. 1.1.

The computing device (400) is a physical device that may include one or more processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of the components illustrated in FIG. 4 is described below.

In one or more embodiments of the disclosure, the processor(s) (402) may be an integrated circuit for processing instructions. For example, the processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one or more embodiments of the disclosure, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the processor(s) (402), non-persistent storage (404), and persistent storage (406). Many different types of computing devices exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by processor(s), is configured to perform one or more embodiments of the disclosure. Embodiments of the software instructions may be written in various languages, for example, C, C++, Python, etc.

Embodiments disclosed herein establish different security schemes associated with different boot personalities. Embodiments have the advantage of securing a hardware configuration in association with different boot personalities in a single device. Further, embodiments may establish the write protections of memory devices and/or enable features through hardware strapping associated with different boot personalities.

Specific embodiments have been described with reference to the accompanying figures. In the above description, numerous details are set forth as examples. It will be understood by those skilled in the art, and having the benefit of this Detailed Description, that one or more embodiments described herein may be practiced without these specific details and that numerous variations or modifications may be possible without departing from the scope of the embodiments. Certain details known to those of ordinary skill in the art may be omitted to avoid obscuring the description.

The advantages discussed above and throughout the detailed description should be understood as being examples associated with one or more problems being solved by embodiments of the disclosure. However, one or more embodiments of the disclosure disclosed herein should not be limited to solving the same/similar problems. The disclosed embodiments are broadly applicable to address a range of problems beyond those discussed herein.

In the above description, numerous details are set forth as examples of embodiments described herein. It will be understood by those skilled in the art, that have the benefit of this Detailed Description, that one or more embodiments described herein may be practiced without these specific details and that numerous variations or modifications may be possible without departing from the scope of the embodiments described herein. Certain details known to those of ordinary skill in the art may be omitted to avoid obscuring the description.

In the above description of the figures, any component described with regard to a figure, in various embodiments described herein, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components.

Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase 'connected' refers to any direct (e.g., wired directly between two devices) or indirect (e.g., wired and/or wireless connections between any number of devices connecting the connected devices) connection.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing boot personalities in a network device, comprising:
   powering on the network device;
   after powering on:
      outputting, from a programmable component of the network device, a first signal indicative of a first setting; and toggling one or more switches based on the first signal indicative of the first setting, including establishing the presence of at least one of the one or more first processor devices based on the first signal prior to the toggling,
      wherein the toggling results in connecting at least one of one or more first processor devices in the network device associated with the first setting and disconnecting at least one of one or more second processor devices in the network device associated with a second setting.

2. The method of claim 1, wherein the one or more first processor devices comprise a Baseboard Management Controller (BMC).

3. The method of claim 1, wherein the one or more first processor devices comprise a Trusted Platform Module (TPM) and a system control device (SCD).

4. The method of claim 1, wherein the first setting is associated with a first operating system.

5. The method of claim 1, further comprising:
   after the toggling:
      configuring the programmable component for a second setting;
      power cycling the network device after the configuring;
      outputting, after the power cycling and from the programmable component of the network device, a second signal indicative of a second setting;
      toggling the one or more switches based on the second signal indicative of the second setting,
      wherein the toggling results in disconnecting the at least one of the one or more first processor devices and connecting the at least one of the one or more second processor devices.

6. The method of claim 5, wherein configuring the programmable component comprises:
   accessing the programmable component through a direct physical connection to the network device.

7. The method of claim 5, wherein the second setting is associated with a second operating system different from a first operating system associated with the first setting.

8. A network device comprising:
   a first set of processor devices associated with a first setting;
   a second set of processor devices associated with a second setting;
   one or more switches connected to the first and second set of processor devices;
   a programmable component that outputs a first signal indicative of the first setting or the second setting subsequent to a power cycle of the network device;

wherein the switches are toggled based on the first signal to disconnect at least one of the one or more first processor devices and connect the at least one of the one or more second processor devices, wherein the presence of at least one of the one or more first processor devices is established prior to the toggling.

9. The network device of claim 8, wherein the one or more first processor devices comprise a Baseboard Management Controller (BMC).

10. The network device of claim 8, wherein the one or more first processor devices comprise a Trusted Platform Module (TPM) and a system control device (SCD).

11. The network device of claim 8, wherein after the toggling, the network device is configured to:

configure the programmable component for the second setting;

power cycling the network device after the configuring;

outputting, after the power cycling and from the programmable component of the network device, a second signal indicative of the second setting;

toggling the one or more switches based on the second signal, wherein the toggling results in disconnecting the at least one of the one or more first processor devices and connecting the at least one of the one or more second processor devices.

12. The network device of claim 8, wherein the second setting is associated with a second operating system different from a first operating system associated with the first setting.

13. A method for managing boot personalities, the method comprising:

receiving a configuration signal for a programmable component of a network device for a first setting;

wherein the configuration signal causes the network device to:

power cycle;

after power cycling, output, by the programmable component, a first signal indicative of the first setting;

toggle one or more switches based on the first signal, wherein the toggling results in connecting at least one of one or more first processor devices associated with the first setting and disconnecting at least one of one or more second processor devices associated with a second setting, wherein the network device establishes the presence of at least one of the one or more first processor devices based on the first signal prior to the toggling.

14. The method of claim 13, the method further comprising: receiving an error indication when the at least one of the one or more first processor devices is not present in the network device.

15. The method of claim 13, wherein the configuration signal is transmitted to the programmable component through a direct physical connection to the network device.

16. The method of claim 13, wherein the second setting is associated with a second operating system different from a first operating system associated with the first setting boot.

17. The method of claim 13, wherein the one or more first processor devices comprise a Baseboard Management Controller (BMC).

* * * * *